United States Patent [19]

Morisawa et al.

[11] 4,364,285

[45] Dec. 21, 1982

[54] AUTOMATIC TRANSMISSION

[75] Inventors: Kunio Morisawa; Tatsuo Kyushima, both of Toyota, Japan

[73] Assignee: Toyota Jidosha Kogyo Kabushiki Kaisha, Japan

[21] Appl. No.: 158,518

[22] Filed: Jun. 11, 1980

[30] Foreign Application Priority Data

Jun. 25, 1979 [JP] Japan .................................. 54-79822

[51] Int. Cl.³ ........................ F16H 57/02; F16H 37/08
[52] U.S. Cl. ..................................... 74/606 R; 74/695
[58] Field of Search ................ 74/695, 752 C, 606 R, 74/730, 732, 688

[56] References Cited

U.S. PATENT DOCUMENTS

| | | | |
|---|---|---|---|
| 2,740,303 | 4/1956 | Bock et al. | 74/752 C |
| 3,164,035 | 1/1965 | Ellis et al. | 74/752 C |
| 3,360,998 | 1/1968 | Griffel | 74/730 |
| 3,491,621 | 1/1970 | Moan | 74/730 |
| 3,648,544 | 3/1972 | Tanaka | 74/695 |
| 3,703,107 | 11/1972 | Piret | 74/606 |

*Primary Examiner*—Kenneth Dorner
*Attorney, Agent, or Firm*—Stevens, Davis, Miller & Mosher

[57] ABSTRACT

An automatic transmission, including a transmission casing and a transaxle casing formed with connecting flanges and joined together by means of these connecting flanges, with a torque converter and a differential gear mechanism being mounted in the transaxle case, while a hydraulic fluid pump mounted with its input shaft coaxial with and directly drivingly connected to the power input shaft of the torque converter, a gear transmission mechanism, and a hydraulic fluid pressure control device are mounted in the transmission casing, except for a governor hydraulic fluid pressure regulating valve which is mounted in the transaxle casing, the hydraulic fluid circuit connections between the hydraulic fluid pressure control device and the governor hydraulic fluid pressure regulating valve being provided through ports opening in the mutually abutting faces of the connecting flanges.

4 Claims, 8 Drawing Figures

AUTOMATIC TRANSMISSION

BACKGROUND OF THE INVENTION

The present invention concerns an automatic transmission for automobiles, and, more particularly, concerns an automatic transmission suitable for automobiles of the front engine front wheel drive or the rear engine rear wheel drive type, and relates to an improvement in the construction of such an automatic transmission, from the point of view of improvement of production efficiency.

As an automatic transmission for front engine front wheel drive or rear engine rear wheel drive automobiles, here is a known automatic transmission comprising a fluid torque converter which has a power input shaft at its one end and a power output shaft at its other end, a gear transmission mechanism comprising coaxially arranged input and output shafts and a plurality of hydraulic fluid pressure operated servo devices, which can be shifted between various speed stages by selective supply of control hydraulic fluid pressure to the hydraulic fluid operated control servo devices a hydraulic fluid pressure control device which controls said selective supply of control hydraulic fluid pressure to said hydraulic fluid pressure operated servo devices, a differential gear mechanism, and an endless chain power transmission mechanism, wherein the power output shaft of the fluid torque coverter is drivingly connected to the power input shaft of the gear transmission mechanism by the endless chain power transmission mechanism, and the power output shaft of the gear transmission mechanism is coaxially connected in a power transmitting fashion to the power input shaft of the differential gear mechanism.

For providing supply of hydraulic fluid pressure to the hydraulic fluid pressure control device mentioned above incorporated in such an automatic transmission, a hydraulic fluid pressure supply pump is required. Based upon the consideration that such a hydraulic fluid pressure supply pump should be directly driven from the power output shaft of the internal combustion engine of the automobile, without interposition of the fluid torque converter therebetween, it has generally been practiced for such a hydraulic fluid pressure supply pump to be driven by a hollow shaft which is directly connected to the input shaft of said fluid torque converter, said hollow shaft extending coaxially with respect to the output shaft of said fluid torque converter. In accordance with this, such a hydraulic fluid pressure supply pump has been mounted within a transaxle casing which has contained the fluid torque converter and the differential gear mechanism.

However, since the aforementioned hydraulic fluid pressure control device for providing control hydraulic fluid pressure to the various servo devices has been mounted within a transmission casing which has contained the gear transmission mechanism, during the assembly of such an automatic transmission for front engine front wheel drive or rear engine rear wheel drive type automobiles it becomes necessary to connect hydraulic fluid pipes between the aforesaid hydraulic fluid pressure supply pump, which is mounted in the transaxle casing, and the aforesaid hydraulic fluid pressure control device, which is mounted in the transmission casing, and this makes the work of assembling the automatic transmission more difficult, more complicated, and more expensive; and also another problem arises, in that if, after connecting such hydraulic fluid pipes, a defective seal occurs at one or the other of the connections thereof, this cannot be easily detected or repaired, because the transmission casing has already been coupled to the transaxle casing.

Another difficulty that has arisen relates to connecting hydraulic fluid conduits between the transmission casing and the transaxle casing, in order to conduct supply of hydraulic fluid pressure to, and conduct a governor hydraulic fluid pressure signal from, a governor hydraulic fluid pressure valve mounted rotatably to this transaxle housing. A simple way is required for connecting up such conduits reliably and effectively.

Yet another problem has arisen with regard to the provision of a hydraulic fluid suction or scavenge pipe, which sucks up hydraulic fluid from the bottom of the transmission casing, so as to recycle it through the hydraulic fluid pressure supply pump. Such a pipe, by its nature, has to be rather long. If it is formed in one piece, as has been the case in the prior art, difficulty may well arise in fitting this pipe to the transmission casing, and misalignment of this pipe, either in the axial direction, or angularly, can cause air leakage at the places where it should form a tight seal with the transmission casing, thus endangering the whole functioning of the transmission.

SUMMARY OF THE INVENTION

An object of the present invention is to provide an automatic transmission in which such a hydraulic fluid pressure supply pump is mounted to the transmission casing which contains the transmission gear mechanism, said hydraulic fluid supply pump still being driven by the power input shaft of the fluid torque converter, so that, by the mounting of this pump to the same casing as that in which the transmission gear mechanism is located, the assembly work for hydraulic fluid pipes between them may be completed, before assembling the transaxle casing to this transmission casing. This makes it much easier to complete such assembly work, and also to ensure the soundness of the seals associated therewith. Thereby, by ensuring that the operation of joining the transaxle casing and the transmission casing is simple and foolproof, the process of assembly of an automatic transmission, of such a basic structure as described above, for front engine front wheel drive or rear engine rear wheel drive automobiles, is very much facilitated.

A further object of the present invention is to provide a simple and easy way of connecting hydraulic fluid conduits between the transmission casing and the transaxle casing of such an automatic transmission.

Yet a further object of the present invention is to arrange to make such a hydraulic fluid suction pipe as described above in two separate sections, so that fitting it is made less dimensionally critical and therefore easier.

According to the present invention, these and other objects are attained by the provision of an automatic transmission for an automobile with an engine, comprising: a transmission casing; a transaxle casing; the transmission casing and the transaxle casing being formed with connecting flanges with matching faces which abut together, and being joined together by means of these connecting flanges; a fluid torque converter, mounted in the transaxle casing, comprising a power input shaft on its one side and a power output shaft on its other side, the input shaft being adapted for connection to the engine; a hydraulic fluid pressure supply pump, comprising a hollow power input shaft which is directly connected to the power input shaft of the fluid torque converter and which extends coaxially with the power output shaft of the fluid torque converter which passes through its central hole, the pump being mounted to the transmission casing and being opposed to the transaxle casing; a differential gear mechanism comprising a power input shaft extending with its axis generally parallel to the axis of the fluid torque converter, the differential mechanism being located in the transaxle housing generally in parallel with the fluid torque converter; a gear transmission mechanism, mounted in the transmission casing, comprising coaxially arranged power input and power output shafts, and a plurality of hydraulic pressure operated servo devices, the gear transmission mechanism being shiftable between various speed stages according to selective supply of control hydraulic fluid pressure to the hydraulic fluid pressure operated servo devices, the power output shaft of the gear transmission mechanism being drivingly connected to and coaxial with the power input shaft of the differential gear mechanism; an endless chain power transmission mechanism which drivingly connects the power input shaft of the gear transmission mechanism to the power output shaft of the fluid torque converter; and a hydraulic fluid pressure control device, mounted in the transmission casing, which controls supply of control hydraulic fluid pressure to the hydraulic fluid pressure operated servo devices.

Further, according to a particular feature of the present invention, in conjunction with the fact that it is convenient to mount a governor hydraulic fluid pressure control valve within the transaxle casing, so that it may rotate at the same speed as and in conjunction with the power input shaft for the above mentioned differential gear mechanism, the present invention provides a useful structure for connection of hydraulic fluid passages between such a governor hydraulic fluid pressure control valve and the above mentioned hydraulic fluid pressure control device, by forming hydraulic fluid passages in the walls of said transmission casing and said transaxle casing, these hydraulic fluid passages terminating in hydraulic fluid transfer ports on the mutually abutting flange faces of the transmission casing and the transaxle casing, these hydraulic fluid transfer ports being directly opposed to one another, so that, when the transmission casing is assembled to the transaxle casing, a hydraulic fluid pressure circuit is established between said governor hydraulic fluid pressure control valve and said hydraulic fluid pressure control device simply and without the need of installing any pipes between them during or after the operation of connecting the transmission casing to the transaxle casing.

According to a further particular feature of the present invention, an advantageous and useful structure is provided for the manufacturing and assembly of a hydraulic fluid suction pipe which sucks up or scavenges hydraulic fluid from a hydraulic fluid pan which is attached to the lower portion of the transmission casing, and which contains hydraulic fluid to a level which submerges part of said hydraulic fluid pressure control unit, said hydraulic fluid suction pipe being mounted in the transmission casing for supplying such scavenged or sucked up hydraulic fluid to the aforesaid hydraulic fluid pressure supply pump, by providing such a hydraulic fluid suction pipe as formed of an upper and a lower section which are snugly joined together by, according to another particular feature of the present invention, abutting a tapered end of the one into an opened out end of the other, with a hydraulic fluid seal ring therebetween. Thereby, the operation of assembling the hydraulic fluid conduits in the transmission casing may be further simplified and reduced in cost, as will become apparent hereinafter.

According to yet another feature of the present invention, a socket is provided as formed on the transmission casing, which closely receives the side of the portion of the upper driving sprocket of the endless chain mechanism which is remote from the torque converter, with a small gap being left therebetween. Thus this sprocket can be supported, during assembly of the automatic transmission.

Other objects, features and advantages of the present invention will become clear from the following disclosure of a preferred embodiment.

BRIEF DESCRIPTION OF THE DRAWINGS

The present invention will become more fully understood from the following description of a preferred embodiment thereof, which is to be taken in conjunction with the accompanying drawings. It should be clearly understood, however, that the description of the embodiment, and the drawings, are provided purely for the purposes of illustration and exemplification only, and are in no way to be taken as limitative of the scope of the present invention. In the drawings.

DESCRIPTION OF THE PREFERRED EMBODIMENT

Figure 1:
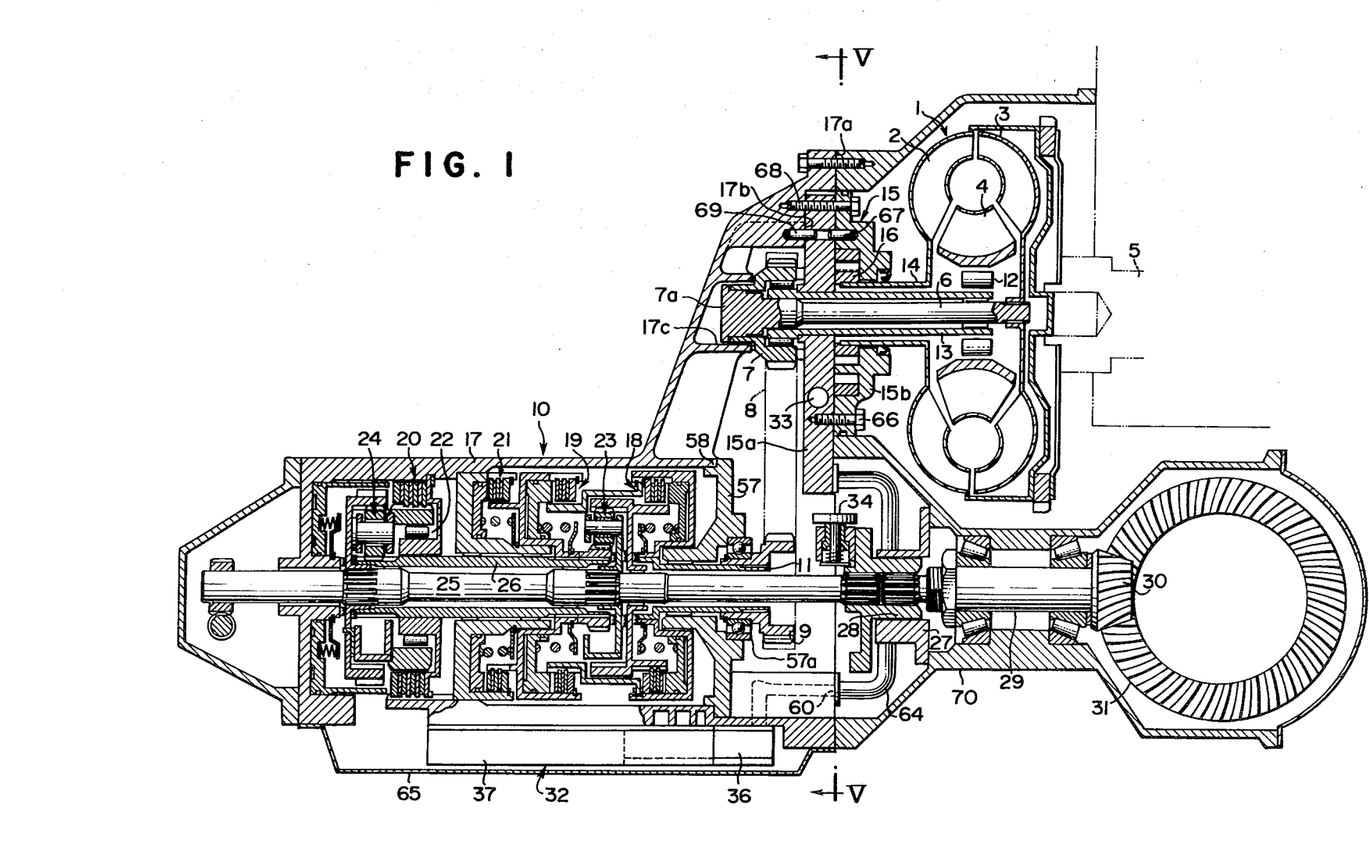
FIG. 1 is a longitudinal cross sectional view through a preferred embodiment of the automatic transmission according to the present invention, showing a hydraulic torque converter, a hydraulic fluid pressure pump, a transmission gear mechanism, and a differential gear mechanism.

In FIG. 1 there is shown a longitudinal cross sectional view of a preferred embodiment of the automatic transmission according to the present invention. This automatic transmission is particularly adapted for a front engine front wheel drive automobile, although it can be also adapted to a rear engine rear wheel drive automobile. The general layout of the automatic transmission shown in the drawing is similar to that disclosed in Japanese patent application No. 53-9093 (1978), which is assigned to the same assignee as is the present application, and which has been published as Japanese laying open publication No. 54-102457 (1979).

In FIG. 1, the reference numeral 1 designates a hydraulic torque converter, which comprises a torque converter pump impeller 2, a torque converter turbine 3, and a torque converter stator 4. A shaft designated by reference numeral 5, which is shown only partially, by phantom lines, is the power output shaft of an internal combustion engine which is not shown in the figure, and this shaft 5 is drivingly coupled to the hydraulic torque converter pump impeller 2. The hydraulic torque converter stator 4 is supported on a hollow fixed support shaft 13 via a one way clutch 12, and the hydraulic torque converter turbine 3 is drivingly connected to the hydraulic torque converter power output shaft 6, which passes down the middle of the hollow fixed support shaft 13, and whose left hand end in the figure is rotationally coupled to a driving sprocket wheel 7, which is mounted thereon. An endless chain 8 passes around the driving sprocket wheel 7, which is located at a relatively upper position, and a driven sprocket wheel 9, which is located at a relatively lower position, and transmits power between them. The driven sprocket wheel 9 is drivingly connected to and mounted on a speed changing transmission gear mechanism power input shaft 11, which is constructed as a hollow shaft, and which inputs rotary power to a speed changing transmission gear mechanism 10. Further, the hydraulic torque converter pump impeller 2 is drivingly coupled to a hollow hydraulic fluid pressure pump drive shaft 14, which is a directly connected to a drive gear 16 of an hydraulic fluid pressure supply pump 15, and thus, as the hollow hydraulic fluid pressure pump drive shaft 14 is driven by the rotation of the internal combustion engine power output shaft 5, and rotates, it drives the hydraulic fluid pressure supply pump 15, and causes it to supply hydraulic fluid at an elevated pressure.

The hydraulic torque converter 1, comprising the pump impeller 2, the torque converter turbine 3, and the torque converter stater 4, is provided generally in the upper part of a transaxle casing 70, which will be described in more detail later. Further, the hydraulic fluid pressure supply pump 15 projects partly into this transaxle casing 70, although, as will be seen later, this hydraulic fluid pressure supply pump 15 is secured to an automatic transmission casing 17, which will also be described later, and is located in opposing relation to the transaxle casing 70 and inside the connecting flanges (later described), which connect said transaxle casing 70 to the automatic transmission casing 17.

The speed changing transmission gear mechanism 10 is located inside an automatic transmission casing 17. The speed changing transmission gear mechanism 10 comprises a hydraulically operated forward clutch 18, a hydraulically operated reverse clutch 19, a hydraulically operated first brake 20, a hydraulically operated second brake 21, a one way clutch 22, a first planetary gear mechanism 23, a second planetary gear mechanism 24, an intermediate hollow shaft 26, and a power output shaft 25. In a per se well known way, as the forward and reverse clutches 18 and 19 and the first and second brakes 20 and 21 are selectively engaged and disengaged by supply of control hydraulic fluid pressure, which is provided from a hydraulic fluid pressure control device which will be described later, the rotary power which is input to the speed changing transmission gear mechanism power input shaft 11 from the driving sprocket wheel 7 via the endless chain 8 and the driven sprocket wheel 9 is transmitted, at any one of a selectable range of gearing ratios and directions, to the speed changing transmission gear mechanism power output shaft 25.

In more detail, when the forward clutch 18 and the first brake 20 are engaged, the speed changing transmission gear mechanism 10 is set to its first forward speed; when the forward clutch 18 and the second brake 21 are engaged, the speed changing transmission gear mechanism 10 is set to its second forward speed; when the forward clutch 18 and the reverse clutch 19 are engaged, the speed changing transmission gear mechanism 10 is set to its third forward speed, which is its direct connection state; and when the reverse clutch 19 and the first brake 20 are engaged, the speed changing transmission gear mechanism 10 is set to its reverse gear stage.

The structure of the hydraulic fluid pressure supply pump 15 will now be described in more detail. This hydraulic fluid pressure supply pump 15 comprises a drive gear 16 (already mentioned), a pump body 15a, and a pump cover 15b. The pump cover 15b is overlaid on the pump body 15a, and they define an hydraulic fluid pressure pump chamber between them in which the drive gear 16 is mounted. The pump cover 15b is secured to the pump body 15a by a plurality of bolts 66, and, further, the mutual relative position between these two elements is positively ensured by the provision of a plurality of indexing dowels 67, which are provided between these two members as extending between opposing holes in both of them, so as to locate them. Further, the pump body 15a is mounted on an hydraulic fluid pressure supply pump mounting surface 17b formed on an upper part of the transmission casing 17, and is secured thereto by bolts 68. Further, in this case also, the relative mutual position between the transmission casing 17 and the pump body 15a is ensured by a plurality of indexing dowels 69, which are provided between these two members, and which project into mutually opposing holes bored in these members. The pump mounting surface 17b is recessed, relative to a circumferential transmission casing joining flange 17a, which passes around the outer edge of the right hand end as seen in the figure of the transmission casing 17, and, as will be seen later, serves to mount the transmission casing 17 to the transaxle casing 70.

The left hand end 7a in FIG. 1 of the driving sprocket wheel 7 which is drivingly connected to the power output shaft 6 of the hydraulic torque converter 1 is received inside a socket 17c formed integrally in the transmission casing 17, so that said driving sprocket wheel 7 does not touch the sides of this socket 17c, but is loosely housed therein. This arrangement is in order that, when this automatic transmission is being assembled, the hydraulic torque converter power output shaft 6 and the driving sprocket wheel 7 may be supported by the end 7a of the sprocket wheel 7. This facilitates the assembly process for the automatic transmission.

The speed changing transmission gear mechanism power output shaft 25 is connected to a differential mechanism power input shaft 29 via a rotating splined sleeve 28, whose inside is splined for engaging with corresponding splines on the respective ends of the differential mechanism power input shaft 29 and the speed changing transmission gear mechanism power output shaft 25. This rotating splined sleeve 28 is rotatably supported by a supporting bush adaptor 27, which is secured to the transaxle housing 70. Rotary power is therefore transmitted from the power output shaft 25 of the speed changing transmission gear mechanism 10, via the differential mechanism power input shaft 29, to a helically cut differential pinion 30, which is provided on the right hand end in the drawing of the differential mechanism power input shaft 29, and which meshes with a helically cut crown wheel 31. This helically cut crown wheel 31 is incorporated in a differential mechanism not shown in the drawings whose power output shafts transmit rotary power to the driving wheels of the automobile.

In the lower part of the automatic transmission casing 17, below the speed changing transmission gear mechanism 10, is located the main body 32 of the hydraulic fluid pressure control device which controls engagement of the clutches, brakes, etc. of the automatic transmission. Further, in conjunction therewith, a line hydraulic fluid pressure regulating control valve 33, which constitutes a part of the hydraulic fluid pressure control device, and which regulates the hydraulic fluid output pressure of the hydraulic fluid pressure supply pump 15 to a predetermined hydraulic fluid pressure level, is located in a part of the hydraulic fluid pressure supply pump body 15a. Also, a governor hydraulic fluid pressure regulating control valve 34 is attached to a peripheral portion of the rotating splined sleeve 28. This governor hydraulic fluid pressure regulating control valve 34, therefore, rotates along with the rotating spline sleeve 28, at the same rotational speed as the power output shaft 25 of the speed changing transmission gear mechanism 10, which is proportional to and representative of the road speed of the automobile. According to its rotational speed, the governor hydraulic fluid pressure regulating control valve 34 regulates a hydraulic pressure supplied to it, and produces a governor hydraulic pressure whose value varies according to the rotational speed of the valve, in other words, according to the running speed of the automobile.

The hydraulic fluid pressure control device main body 32 incorporates various hydraulic fluid pressure actuated control valves, which are operated by control hydraulic fluid pressure produced within the hydraulic fluid pressure control device, and a manual shift valve which is operated by the driver of the automobile. These hydraulic fluid pressure actuated control valves comprise a throttle hydraulic fluid pressure control valve which outputs a throttle hydraulic fluid pressure which changes according to the amount of depression of the accelerator pedal of the automobile as it is stepped on by the driver thereof, and speed shift valves which switch supply of hydraulic fluid pressure to the forward and reverse clutches 18 and 19, and the first and second brakes 20 and 21, according to the value of the throttle hydraulic fluid pressure, and the value of the governor hydraulic fluid pressure which represents the road speed of the automobile.

Figure 2:
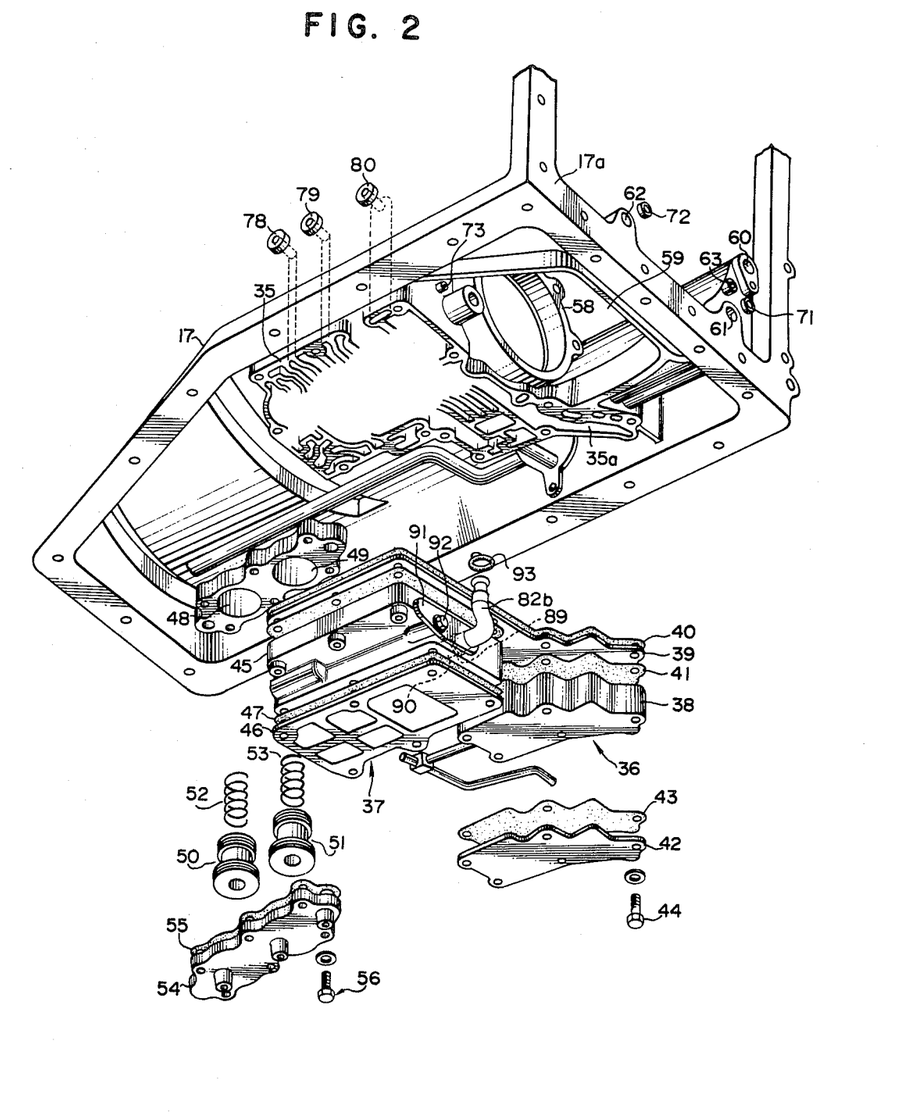
FIG. 2 is a perspective view from underneath, showing in an exploded form the parts of the automatic transmission of FIG. 1 which constitute a hydraulic fluid pressure control device, for explanation thereof, and also showing associated portions of the transmission casing.

Referring now to FIG. 2, the hydraulic fluid pressure control device main body 32, which is shown in more detail in this figure, comprises a grooved portion 35 integrally formed in a lower part of the transmission casing 17 and two valve assemblies 36 and 37, each of which engages with a part of the grooved mating face of the grooved portion. As shown partially in more detail in FIG. 3, the grooved mating face is formed with a number of hydraulic fluid grooves, which, in conjunction with the mating surfaces of the valve assemblies 36 and 37 which contact closely thereto, in a per se well known way constitute various hydraulic fluid pressure circuits which communicate with one another the various hydraulic fluid pressure control valves whose bodies are constituted by the valve assemblies 36 and 37, and which supply actuating hydraulic fluid pressure to the hydraulic fluid operated clutches 18 and 19 and the hydraulic fluid operated brakes 20 and 21, etc., of the speed changing gear transmission mechanism 10.

The assembly 36 comprises a valve body member 38, in which is formed a manual control valve, a partition plate 39, which is interposed between the grooved portion 35 and the valve body member 38 and serves to define the above mentioned various hydraulic fluid pressure circuits, part of sealing gaskets 40 and 41, a cover 42, which closes the lower side of the valve body member 38, and a gasket 43, and is clamped against a part of the grooved mating surface of the grooved portion 35, by a plurality of bolts 44.

The other valve assembly 37, similarly, comprises a valve body member 45, in which are formed the hydraulic fluid pressure actuated control valves such as the throttle hydraulic pressure control valve, the speed shift valves, etc., the other part of the gaskets 40 and 41, a cover 46 in which is comprised a strainer, a gasket 47 sealing the cover 46 onto the body member 38, and a plurality of securing bolts similar to the bolts 41, which are not shown in the drawing, but which pass through from the outside of the cover 46 through the valve body member 45 to engage in the transmission casing 17 so as to clamp these elements to the other part of the grooved mating surface of the grooved portion 35. The partition plate 39 and the sealing gaskets 40 and 41 are provided as common with both of the assemblies 36 and 37, for ease of manufacture and assembling.

Two accumulator cylinder holes, designated as 48 and 49, are formed in the transmission case 17, and, in cooperation with accumulator piston elements 50 and 51 and compression coil springs 52 and 53 which are inserted into these accumulator cylinder holes, and a cover plate 54 and gasket 55, secured over the cylinder accumulator holes by bolts 56, a pair of hydraulic fluid accumulators are defined for the hydraulic fluid pressure control circuits of the automatic transmission, in a per se well known fashion.

Towards the right hand end in FIGS. 1 and 2 of the transmission casing 17 there is formed a front support attaching portion 58, which is adapted for receiving the front power output shaft supporting member 57, which, via a bearing 57a, supports the front end, i.e. the right hand end in FIG. 1, of the transmission gear mechanism power output shaft 25. In general, it is necessary and advantageous for the lower opening 59 (best seen in FIG. 2), which opens from underneath the transmission casing 17 to the front side of the front support member attaching portion 58, to be relatively large and open, in order to assist with accurate machining of the flat end surface and the internal cylindrical surface of said front support attaching portion 58. Also, the opening in the front support attaching portion 58 should be relatively large, in order to allow the various components of the speed changing transmission gear mechanism 10 to be inserted into the interior of the transmission casing 17, during manufacture of the automatic transmission. In accordance with the provision of this relatively large opening 59, the part of the grooved portion 35a which engages the valve assembly 36 is arranged so as to extend forward along the side of this large opening 59.

Now, since the line hydraulic fluid pressure regulating control valve 33 is located in the housing of the hydraulic fluid pressure supply pump 15, the manual shift valve is the most forwardly located control valve as viewed along the flow direction of hydraulic fluid in the hydraulic fluid pressure control main body 32. Therefore, by making the grooved portion 35a which cooperates with the valve assembly 37 including the manual shift valve as extending forward along the side of the relatively large opening 59 in the transmission casing 17, so that it may come closer to the front right hand end in the figures of the transmission casing 17, the length of the hydraulic fluid path between this valve assembly 36 and the line hydraulic fluid pressure regulating control valve 33 may advantageously be made shorter.

Figures 3, 4:
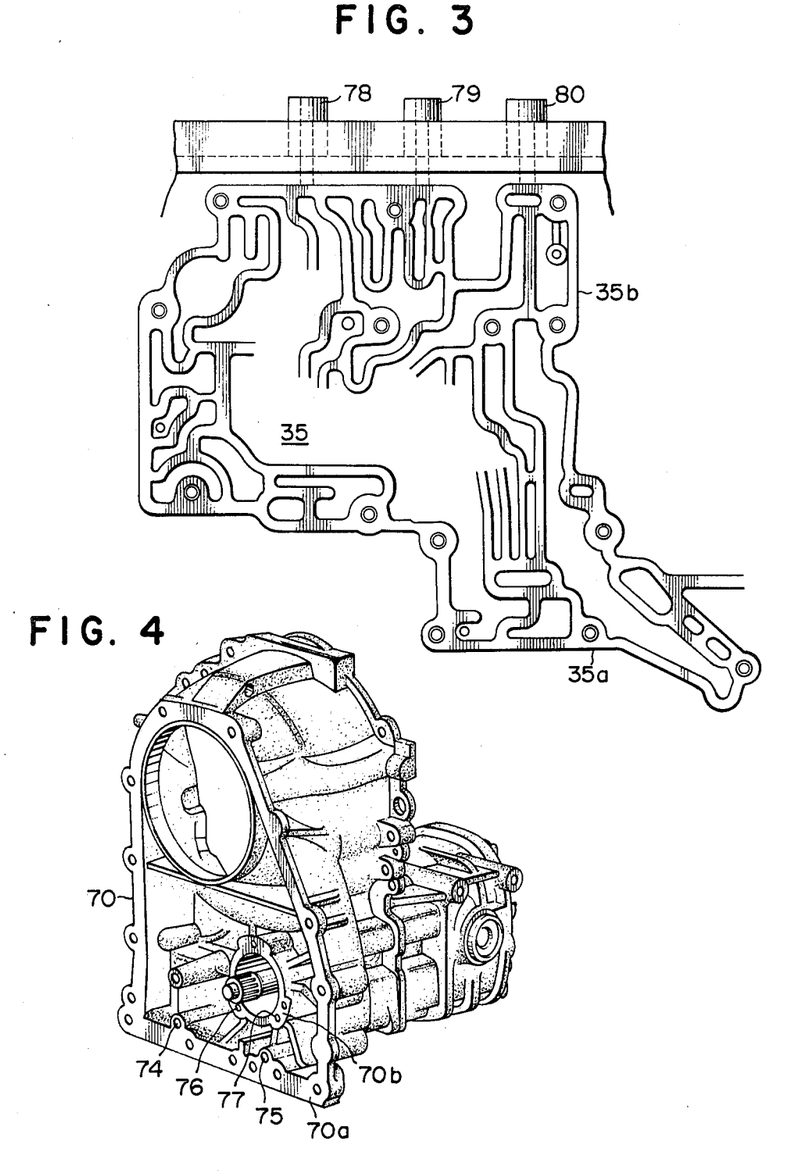
FIG. 3 is a view from underneath of part of the transmission casing seen in FIGS. 1 and 2, which is formed with a pattern of grooves for constituting hydraulic fluid control circuits, for detailed explanation thereof.
FIG. 4 is a perspective view of the transaxle casing of the automatic transmission of FIGS. 1-3.

The differential gear mechanism comprising the helically cut pinion 30 and helically cut crown wheel 31 is located, together with the hydraulic torque converter 1, in a transaxle casing 70 which is best seen in FIG. 4, which is a perspective view thereof. As referred to above, a governor hydraulic fluid pressure regulating valve 34 is mounted on the periphery of the rotating splined sleeve 28, which rotates within the supporting bush adaptor 27 fitted into the transaxle casing 70. By the balance of centrifugal force against the resisting force of a compression coil spring and hydraulic fluid pressure acting on a land difference, this governor hydraulic fluid pressure regulating valve 34 regulates the line hydraulic fluid pressure which is supplied to it, and produces a governor hydraulic fluid pressure as output, indicating the road speed of the automobile. The communication of the line hydraulic fluid pressure to the governor hydraulic fluid pressure regulating valve 34, and the receiving of the output hydraulic fluid pressure signal therefrom, is performed through hydraulic fluid passages formed along the wall of the transaxle casing 70, and hydraulic fluid passages formed along the wall of the transmission casing 17, as will be explained later, and via grooves which are not shown but which are provided through the supporting bush adaptor 27 and the rotating splined sleeve 28, as per se well known in the art.

Referring now to FIG. 2, a port 60, which is located at the right hand side in the drawing of the transmission casing 17, is a line hydraulic fluid pressure receiving port, which is connected to the line hydraulic fluid pressure regulating valve 33 by a line hydraulic fluid pressure conduit 64, and which leads this line hydraulic fluid pressure, controlled to a predetermined hydraulic fluid pressure level by the above mentioned line hydraulic fluid pressure regulating valve 33, to the hydraulic fluid pressure control device main body 32, as explained above. Further, on the flattened mating end surface 17a of the transmission casing 17 there is provided a port 61, which sends out the line hydraulic fluid pressure toward the governor hydraulic fluid pressure regulating valve 34 provided in the transaxle casing 70, and a port 62, which receives the governor hydraulic fluid pressure generated by said governor hydraulic fluid pressure regulating valve. Sealing rings 71 and 72 are provided for sealing the connections between these ports 61 and 62 in the transmission casing 17 and the respectively opposing ports in the transaxle casing 70.

Figures 5, 6, 7, 8:
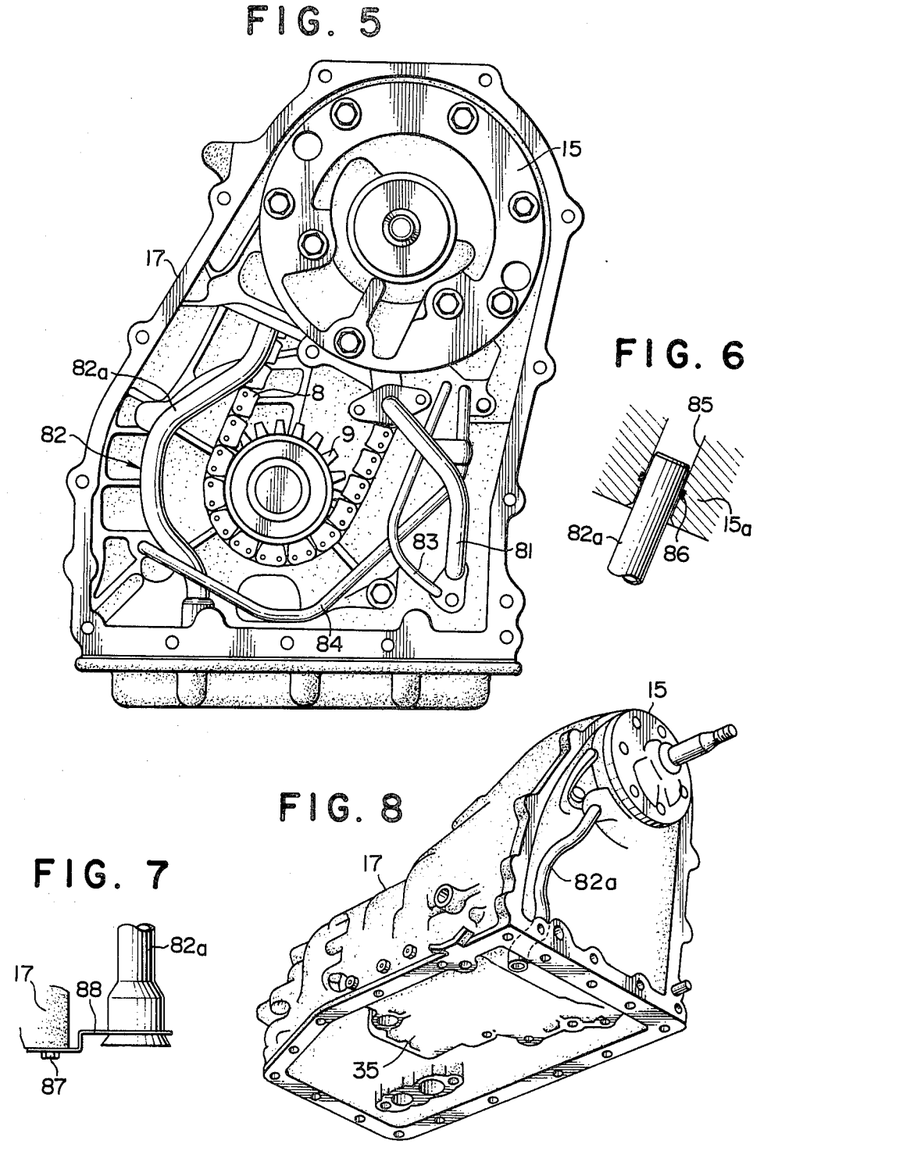
FIG. 5 is a view, taken generally along the section V—V in FIG. 1 in the direction of the arrows, and showing the mating face of the transmission casing of the automatic transmission, for explaining the hydraulic fluid pressure supply pump and the hydraulic fluid pipes associated therewith of the automatic transmission.
FIG. 6 is a part sectional view, showing the upper end of an upper hydraulic fluid suction pipe portion of the automatic transmission of FIGS. 1-5, and showing the way in which it is fitted into a hydraulic fluid pressure supply pump body member.
FIG. 7 is a view showing a construction for securing the lower end of the upper hydraulic fluid suction pipe portion shown in FIG. 6 to the transmission casing.
FIG. 8 is a perspective view, taken from underneath and from the right in FIG. 1, of the transmission casing of the automatic transmission of FIGS. 1-7, showing the fixing arrangement for the upper hydraulic fluid suction pipe portion.

Further, in the flattened mating end surface 17a of the transmission casing 17 there is provided a port 63, which provides a modifying hydraulic fluid pressure to the line hydraulic pressure regulating valve 33, in order to increase the line hydraulic fluid pressure when the automatic transmission is shifted into reverse gear stage. Further, the throttle hydraulic fluid pressure is supplied to the line hydraulic fluid pressure regulating valve 33, from the port 73, via a conduit 84 (FIG. 5).

The hydraulic fluid pressure control device main body 32, comprising the valve assemblies 36 and 37 and the grooved portion 35, etc., is covered by a hydraulic fluid pan 65 which is attached to the bottom of the transmission casing 17. This hydraulic fluid pan, during use of the automobile, contains a quantity of hydraulic fluid, and at this time a part of the hydraulic fluid pressure control device main body 32 is submerged under the surface of this hydraulic fluid.

In FIG. 4 the arrangement of ports on the transaxle casing 70 can be seen in more detail. The ports 74 and 75 open in the flattened mating end surface 70a of the transmission casing 70 which opposes the flattened mating end surface 17a of the transmission casing 17, and, when these flattened mating end surfaces of the cases are abutted together, these ports 74 and 75 are respectively aligned with the above mentioned ports 61 and 62 provided on the flattened mating end surface 17a of the transmission casing 17. The ports 74 and 75 communicate, respectively, with the ports 76 and 77, via passages formed in the wall of the transaxle casing 70, and these ports 76 and 77 are located on the annular end surface 70b of the transaxle casing 70, against which abuts the supporting bush adaptor 27, which, as above explained, supports the rotating splined sleeve 28 which carries the governor hydraulic fluid pressure regulating valve 34. Ports which are not shown in the drawings are provided in the opposing end surface of the supporting bush adaptor 27, to oppose these ports 76 and 77, and these ports communicate, via passages formed in the supporting bush adaptor 27, with circular grooves formed on the circumferential inner surface of this supporting bush adaptor. These circumferential grooves communicate with corresponding circumferential grooves formed on the outer surface of the rotating splined sleeve 28. These circumferential grooves in the rotating spline sleeve 28 communicate, via passages formed in the sleeve 28, with the governor hydraulic fluid pressure regulating valve 34, so as to supply the line hydraulic fluid pressure to the governor valve and to receive the governor hydraulic fluid pressure from the governor valve.

Referring to FIGS. 2 and 3, on the side surface of the transmission casing 17 there are provided hydraulic fluid pressure detecting apertures 78, 79, and 80, for, respectively, detecting the values of line hydraulic fluid pressure, throttle hydraulic fluid pressure, and governor hydraulic fluid pressure, from hydraulic fluid passages included in the grooved portion 35.

FIG. 5 is an end on view of the right hand end in FIG. 1 of the transmission casing 17, taken along the line V—V in FIG. 1, and more particularly showing the structure of the hydraulic fluid pressure conduits for the hydraulic fluid pressure supply pump 15. The hydraulic fluid conduit 81 shown in FIG. 5 is a line hydraulic fluid pressure supply pipe, and leads the line hydraulic fluid pressure, controlled by the line hydraulic fluid pressure regulating valve 33 to a predetermined hydraulic fluid pressure level, to the above mentioned port 60. The hydraulic fluid conduit 82, which will be explained in more detail later, is a hydraulic fluid suction pipe, by which the hydraulic fluid pressure supply pump 15 scavenges hydraulic fluid from the hydraulic fluid pan 65, so as to recycle it. The hydraulic fluid conduit 83, which is communicated with the port 63 shown in FIG. 2, serves to conduct a modifying hydraulic fluid pressure to the hydraulic fluid pressure supply pump 15, so as to increase the output line hydraulic pressure provided by this supply pump 15, when the automatic transmission is shifted into reverse range. The hydraulic conduit 84 is a conduit for leading the throttle hydraulic fluid pressure as a control pressure to the line hydraulic fluid pressure regulating valve 33, for modifying the line hydraulic fluid pressure according to the value of throttle hydraulic fluid pressure, and this hydraulic fluid conduit 84 is connected to the port 73.

According to prior art constructions of automatic transmissions, in which a pipe similar in function to the hydraulic fluid suction pipe 82 of the present invention was connected at its upper end to the housing of the hydraulic fluid pressure supply pump 15, and at its lower end to the valve assembly of the hydraulic fluid pressure control device, it was rather difficult to attain the correct positioning of this pipe during assembly of the automatic transmission. Therefore, from such considerations, according to a particular feature of the present invention, the hydraulic fluid suction pipe 82 is composed of two separate pieces, denoted in the drawings by reference numerals 82a and 82b. The upper end of the upper part 82a of the hydraulic fluid suction pipe 82 (see FIG. 8) is inserted into the hole 85 in the housing 15a of the hydraulic fluid pressure supply pump 15, as shown in detail in FIG. 6, and sealed thereto with a sealing ring 86. The lower end of the upper part 82a of the hydraulic fluid suction pipe 82 is, as may be seen in FIG. 7, opened out, and is supported by a bracket 88, which is attached to a suitable part of the transmission casing 17, by a bolt 87. The hydraulic fluid suction pipe portion 82b, which is the lower portion thereof, is a short pipe element which is bent approximately through a right angle, and its lower end is inserted into a hole 90 provided in the valve body member 45, and sealed thereto with an O-ring 89 (see FIG. 2), while its upper end is formed like a nozzle so that it may snugly fit into the opened out lower end of the upper hydraulic fluid suction pipe portion 82a, and be sealed thereto by a sealing ring 93. The hole 90 may be bored coaxially with a cylinder bore for a shift valve formed in the valve body member 45, at one end thereof, for ease of fabrication and machining of the valve body member 45 and the hole 90. To the hydraulic fluid suction pipe lower portion 82b is fixed a bracket 91, so that this pipe portion 82b may be attached to the body member 45, by attaching this bracket 91 thereto by bolt 92.

By this construction of the hydraulic fluid suction pipe 82, using two parts therefor, i.e. the upper portion 82a and the lower portion 82b, the assembling and disassembling of the automatic transmission is much facilitated. Further, if it is so adapted that there is some freedom in the axial direction of mating between the upper and lower hydraulic fluid suction pipe portions 82a and 82b, so that they are relatively moveable with respect to one another, then, if the upper end of the upper pipe portion 82a is slanted as shown in FIG. 6, small errors in relative position between the lower pipe element 82b and the pump housing 15a, either in the vertical or the horizontal direction, or in both directions, can be absorbed by displacing the upper pipe element 82a either upwards or downwards, thereby reducing difficulty of positioning these elements during assembly of the transmission.

Although the present invention has been shown and described in terms of some preferred embodiments thereof, and in language more or less specific with regard to structural features thereof, and with reference to the illustrative drawings, it should be understood that in an embodiment of the present invention various changes, modifications, and omissions of form and detail can be made by a person skilled in the art, without departing from the essential scope of the present invention. Therefore, it is expressly desired that the scope of the present invention should be uniquely delimited by the legitimate and valid scope of the appended claims, which follow, and not by any of the perhaps purely fortuitous details of the shown embodiment, or of the drawings.

We claim:

1. An automatic transmission for an automobile with an engine, comprising:

a transmission casing:

a transaxle casing:

the transmission casing and the transaxle casing being formed with connecting flanges with matching faces which abut together, and being joined together by means of these connecting flanges;

a fluid torque converter, mounted in the transaxle casing, comprising a power input shaft on its one side and a power output shaft on its other side, the input shaft being adapted for connection to the engine;

a hydraulic fluid pressure supply pump, comprising a hollow power input shaft which is directly connected to the power input shaft of the fluid torque converter and which extends coaxially with the power output shaft of the fluid torque converter which passes through its central hole, the pump being mounted to the transmission casing and being opposed to the transaxle casing;

a differential gear mechanism comprising a power input shaft extending with its axis generally parallel to the axis of the fluid torque converter, the differential mechanism being located in the transaxle housing generally in parallel with the fluid torque converter;

a gear transmission mechanism, mounted in the transmission casing, comprising coaxially arranged power input and power output shafts, and a plurality of hydraulic pressure operated servo devices, the gear transmission mechanism being shiftable between various speed stages according to selective supply of control hydraulic fluid pressure to the hydraulic fluid pressure operated servo devices, the power output shaft of the gear transmission mechanism being drivingly connected to and coaxial with the power input shaft of the differential gear mechanism;

an endless chain power transmission mechanism which drivingly connects the power input shaft of the gear transmission mechanism to the power output shaft of the fluid torque converter;

and a hydraulic fluid pressure control device, mounted in the transmission casing, which controls supply of control hydraulic fluid pressure to the hydraulic fluid pressure operated servo devices;

a governor hydraulic fluid pressure regulating valve rotatably mounted to the transaxle casing, a first hydraulic fluid port formed in the mating surface of the connecting flange of the transmission casing, the first hydraulic fluid port communicating with the hydraulic fluid pressure control device, and a second hydraulic fluid port formed in the mating surface of the connecting flange of the transaxle casing, the second hydraulic fluid port being connected to the governor hydraulic fluid pressure regulating valve;

the first and second hydraulic fluid ports corresponding to one another, when the transmission casing and the transaxle casing are joined together by their connecting flanges, and providing a hydraulic fluid passage between the hydraulic fluid pressure control device and the governor hydraulic fluid pressure regulating valve.

2. An automatic transmission according to claim 1, wherein the transmission casing comprises a hydraulic fluid pan, attached to its lower portion, adapted to contain hydraulic fluid to a level which submerges part of the hydraulic fluid pressure control device;

further comprising a hydraulic fluid suction pipe assembly for sucking up hydraulic fluid from the hydraulic fluid pan to provide hydraulic fluid supply to the hydraulic fluid pressure supply pump, comprising a lower hydraulic fluid suction pipe portion and an upper hydraulic fluid suction pipe portion;

the lower end of the lower hydraulic fluid suction pipe portion being mounted into a hole provided in the hydraulic fluid pressure control device, the upper end of the upper hydraulic fluid suction pipe portion being mounted to a hole provided in the hydraulic fluid pressure supply pump, and the upper end of the lower hydraulic fluid pipe suction portion and the lower end of the upper hydraulic fluid suction pipe portion being sealingly joined together.

3. An automatic transmission according to claim 3, wherein the lower end of the upper hydraulic fluid suction pipe portion is opened out, and the upper end of the lower hydraulic fluid suction pipe portion is formed like a nozzle and fits snugly into said lower end of the upper hydraulic fluid pipe suction pipe portion, and further comprising a sealing ring between the upper and lower hydraulic fluid suction pipe portions.

4. An automatic transmission according to claim 1, wherein the endless chain power transmission device comprises an upper sprocket wheel which is connected to the power output shaft of the fluid torque converter and is on the side of the hydraulic fluid pressure supply pump remote from the fluid torque converter within the transmission casing, and the transmission casing is formed with a socket which closely receives the side of the portion of the upper driving sprocket wheel remote from the torque converter with a small gap being left between.

* * * * *